United States Patent
Meyer et al.

(10) Patent No.: US 9,367,297 B2
(45) Date of Patent: Jun. 14, 2016

(54) METHOD FOR OPERATING AN IT SYSTEM, AND IT SYSTEM HAVING AT LEAST ONE FIRST PROCESSING UNIT AND ONE SECOND PROCESSING UNIT CONNECTED TO ONE ANOTHER

(71) Applicants: Bernd Meyer, Munich (DE); Stefan Pyka, Markt Schwaben (DE); David Von Oheimb, Groebenzell (DE)

(72) Inventors: Bernd Meyer, Munich (DE); Stefan Pyka, Markt Schwaben (DE); David Von Oheimb, Groebenzell (DE)

(73) Assignee: Continental Automotive GmbH, Hannover (DE)

( * ) Notice: Subject to any disclaimer, the term of this patent is extended or adjusted under 35 U.S.C. 154(b) by 209 days.

(21) Appl. No.: 14/351,427

(22) PCT Filed: Oct. 15, 2012

(86) PCT No.: PCT/EP2012/070362
§ 371 (c)(1),
(2) Date: Apr. 11, 2014

(87) PCT Pub. No.: WO2013/053934
PCT Pub. Date: Apr. 18, 2013

(65) Prior Publication Data
US 2014/0298104 A1    Oct. 2, 2014

(30) Foreign Application Priority Data
Oct. 14, 2011    (DE) .......................... 10 2011 084 569

(51) Int. Cl.
*G06F 9/445* (2006.01)
*G06F 11/07* (2006.01)

(52) U.S. Cl.
CPC .. *G06F 8/61* (2013.01); *G06F 8/65* (2013.01); *G06F 11/079* (2013.01)

(58) Field of Classification Search
CPC .................................. G06F 8/60–8/77
USPC .................................. 717/168–178
See application file for complete search history.

(56) References Cited

U.S. PATENT DOCUMENTS 5,487,156 A * 1/1996 Popescu ............... G06F 9/3802
712/217
5,956,408 A * 9/1999 Arnold .................. G06F 21/10
713/1

(Continued)

FOREIGN PATENT DOCUMENTS

WO    WO 02/41147 A1    5/2002
WO    WO 2011/051128   5/2011

OTHER PUBLICATIONS

Remarks on Parallel Bit-Byte CPU Structures of the Programmable Logic Controller; Chapter 20—Miroslaw Chmiel and Edward Hrynkiewicz—Institute of Electronics, Silesian University of Technology, Akademicka 16, 44-100 Gliwice, Poland—2006.*

(Continued)

*Primary Examiner* — Francisco Aponte
(74) *Attorney, Agent, or Firm* — Cozen O'Connor (57) ABSTRACT

An IT system includes at least one first processing unit and one second processing unit. The first and second processing units jointly execute an application program and are each associated with an installation routine designed to control updating of a first or second program part of the application program. A first actual state is associated with the first processing unit and a second actual state is associated with the second processing unit. After system reboot, or as soon as the first and second program part have been successfully stored, or an error is detected when storing the first and/or second program part, predefined processing steps are respectively carried out in a predefined order by the first processing unit aid the second processing unit depending on the actual state of the first processing unit and the actual state of the second processing unit.

11 Claims, 3 Drawing Sheets

(56) References Cited

U.S. PATENT DOCUMENTS

| | | | | |
|---|---|---|---|---|
| 5,978,830 A * | 11/1999 | Nakaya | G06F 8/456 | 718/102 |
| 6,275,752 B1 * | 8/2001 | Giers | F02D 41/266 | 701/33.7 |
| 6,647,301 B1 * | 11/2003 | Sederlund | G05B 19/0428 | 700/108 |
| 6,792,529 B1 * | 9/2004 | See | G06F 8/61 | 712/229 |
| 6,823,251 B1 * | 11/2004 | Giers | B60G 17/0185 | 303/122 |
| 7,191,294 B2 | 3/2007 | Nakamura | G06F 9/522 | 711/147 |
| 7,614,055 B2 * | 11/2009 | Buskens | G06F 9/505 | 717/100 |
| 7,925,791 B2 * | 4/2011 | Ellis | G06F 9/52 | 709/201 |
| 7,971,029 B2 * | 6/2011 | Unno | G06F 9/522 | 712/28 |
| 8,224,885 B1 * | 7/2012 | Doucette | G06F 9/5044 | 709/201 |
| 8,810,454 B2 * | 8/2014 | Cosman | H04W 64/00 | 342/451 |
| 9,166,904 B2 * | 10/2015 | Appanna | H04L 45/00 | |
| 2002/0062480 A1 * | 5/2002 | Kirisawa | G06F 8/65 | 717/168 |
| 2002/0120856 A1 * | 8/2002 | Schmidt | G05B 19/0426 | 713/193 |
| 2005/0033950 A1 * | 2/2005 | See | G06F 8/61 | 713/1 |
| 2006/0212868 A1 * | 9/2006 | Takayama | G06F 9/52 | 718/100 |
| 2006/0248263 A1 * | 11/2006 | Tanigawa | G06F 12/084 | 711/3 |
| 2007/0028120 A1 * | 2/2007 | Wysocki | G06F 21/10 | 713/192 |
| 2007/0064698 A1 * | 3/2007 | Appanna | H04L 45/00 | 370/392 |
| 2009/0234535 A1 * | 9/2009 | Lange | G07C 5/0858 | 701/33.4 |
| 2009/0284913 A1 * | 11/2009 | Wakabayashi | H04L 1/0083 | 361/679.54 |
| 2010/0146497 A1 * | 6/2010 | Kogan | G06F 8/65 | 717/170 |
| 2010/0204880 A1 * | 8/2010 | von Oheimb | G07C 5/0858 | 701/33.4 |
| 2010/0250053 A1 * | 9/2010 | Grill | G07C 5/085 | 701/31.4 |
| 2010/0332796 A1 * | 12/2010 | Gaiarsa | G06F 9/5016 | 712/30 |
| 2011/0093843 A1 * | 4/2011 | Endo | G06F 8/65 | 717/170 |
| 2011/0099544 A1 * | 4/2011 | Haramiishi | G06F 8/665 | 717/168 |
| 2011/0137490 A1 * | 6/2011 | Bosch | G08C 17/02 | 701/2 |
| 2011/0283087 A1 * | 11/2011 | Watanabe | G06F 9/547 | 712/30 |
| 2012/0269341 A1 * | 10/2012 | Hoffmann | G05B 19/0428 | 380/28 |
| 2014/0157253 A1 * | 6/2014 | Padhy | G06F 9/5061 | 717/171 |
| 2014/0189374 A1 * | 7/2014 | Meyer | H04L 9/0866 | 713/194 |
| 2015/0066366 A1 * | 3/2015 | Pang | G01C 21/32 | 701/532 |

OTHER PUBLICATIONS

Andre Adelsbach. Ulrich Huber et al.: "Embedding Trust into Cars—Secure Software Delivery and Installation", Oct. 17, 2005, Proc. of ESCAR, [online] URL: http://www.hgi.rub.de/media/ei/veroeffenlichungen/2008/11/03AHSS05.pdf [abgerifem a, Mar. 7, 2012).

* cited by examiner

| First binary flag CMU | Second binary flag CMI | Possible state |
|---|---|---|
| Erased | Erased | First state ZA |
| Set | Erased | Second state ZSUCa |
| Set | Set | Third state ZSUCb |
| Erased | Set | Fourth state Z_NA |

Figure 2b

| First binary flag SMU | Second binary flag SMI | Possible state |
|---|---|---|
| Erased | Erased | First state ZA |
| Set | Erased | Second state ZSUCa |
| Set | Set | Third state ZSUCb |
| Erased | Set | Fourth state Z_NA |

METHOD FOR OPERATING AN IT SYSTEM, AND IT SYSTEM HAVING AT LEAST ONE FIRST PROCESSING UNIT AND ONE SECOND PROCESSING UNIT CONNECTED TO ONE ANOTHER

CROSS-REFERENCE TO RELATED APPLICATIONS

This is a U.S. national stage of application No. PCT/EP2012/070362, filed on 15 Oct. 2012, which claims priority to the German Application No. 10 2011 084 569.0, filed 14 Oct. 2011, the content of both incorporated herein by reference.

BACKGROUND OF THE INVENTION

1. Field of the Invention

The invention relates to a method for operating an IT system having at least one first processing unit and one second processing unit which are connected to one another. The invention also relates to the IT system.

2. Related Art

A multiplicity or software programs are designed in such a manner that, in order to execute the software program, a respective program part of the software program must be executed by different computer units. This may be due to the fact that performance of a computing unit is not sufficient and/or special security functions are carried out by a computing unit which is specifically designed for this purpose, for example. The need for frequent software updates and the desire to provide sufficient protection for the software of the computer units also create a need for computer systems which allow secure and reliable software upgrading. The requirements imposed on protection against tampering with the software and on reliable software upgrading are particularly high, in particular, in control devices for a motor vehicle, for example in a digital tachograph.

WO 2011/051128 A1 discloses a method for operating a tachograph with an application controller and a security controller. The application controller is assigned a memory and the security controller is assigned a further memory. The security controller is provided with an encrypted program code with at least one assigned signature. The encrypted program code is decrypted using the security controller and is verified using the at least one signature. It is detected whether the decrypted program code is intended for the application controller and/or for the security controller. On the basis of the detection, the program in the memory and/or the further program in the further memory is/are at least partially replaced with the decrypted program code and, on the basis of a result of the verification, the at least partially replaced program and/or the at least partially replaced further program is/are released for execution.

WO 02/41147 A1 discloses a system for updating a multiplicity of distributed electronic devices with an updated operation code, the updated operation code comprising a first set of digital information sequences. Each of the electronic devices comprises a resident operation code with a second set of digital information sequences which are stored inside the electronic devices. The system comprises:
- an update generator which compares an image of the first set of digital information sequences comprising the updated operation code with an image of the second set of digital data sequences comprising the resident operation code and identifies differences between the updated operation code and the resident operation code and then generates an update packet with an instruction set which defines how the updated operation code is generated using at least one part of the second set of digital data sequences of the resident operation code,
- a distribution system which distributes the update packet to the electronic devices in such a manner that the update packet is received fey the electronic devices and is stored therein, and
- a set of client modules which are each installed on each of the electronic devices and access the distribution system and receive the update packet, the instruction set of the update packet being executed by the client module in such a manner that the updated operation cede is generated using at least one part of the second set of digital data sequences of the resident operation code.

SUMMARY OF THE INVENTION

An object on which the invention is based is to provide a method for operating an IT system and the IT system, which make it possible to reliably operate the IT system.

This object is achieved, according to a first aspect, by a method for operating an IT system. The IT system comprises at least one first processing unit and one second processing unit which are connected to one another. The first processing unit and the second processing unit are designed to jointly execute an application program. The first processing unit is assigned a first memory which stores a first program part of the application program which can fee executed by the first processing unit, and the second processing unit is assigned a second memory which stores a second program part of the application program which can be executed by the second processing unit. The first processing unit and the second processing unit are each assigned an installation routine which is designed to control updating of the first program part and the second program part. In this case, the method comprises the following steps: an actual state from a predefined set of possible states is assigned to the first processing unit and a second actual state from the predefined set of possible states is assigned to the second processing unit on the basis of a state of the respective installation routine and on the basis of respective updating progress of the first program part and of the second program part during updating of the application program. After the system has been restarted, or as soon as successful storage of the first program part and of the second program part is identified, or as soon as an error is identified when storing the first program part and/or the second program part, predefined processing steps are respectively carried out in a predefined order by the first processing unit and by the second processing unit on the basis of the actual state of the first processing unit and the actual state of the second processing unit.

This advantageously snakes it possible to ensure reliable operation of the IT system with only very little technical effort, both during updating of the application program and in the event of a disruption and/or interruption in the updating of the application program and in the case of a deliberate and/or unexpected restart (also referred to as reset) of the first and/or second processing unit. A system blockade on account of an inconsistent state of the first program part and of the second program part and/or of the installation routines can be avoided. The first and second program parts can each comprise program code and/or program data.

The successful storage of the first and second program parts may also comprise in this case the first and/or second processing unit having successfully verified the integrity of the first and second program parts, for example.

In one advantageous refinement, the set of possible states comprises a first state representing a first valid program part or a second valid program part and a respective inactive program routine, a second state representing a first valid program part or a second valid program part and a respective active program routine, and a third state representing a first invalid program part or a second invalid program part and a respective active program routine of the first processing unit or of the second processing unit.

In another advantageous refinement after the system has been restarted or as soon as successful storage of the first program part and of the second program part is identified or as soon as an error is identified when storing the first program part and/or the second program part, a new actual state is respectively assigned on the basis of the actual state of the first processing unit and the actual state of the second processing unit under predefined conditions according to the following ruler if the first processing unit is in the first state and the second processing unit is in the second state, the second processing unit can return to the first state or the first processing unit must change over to the second state. If the first processing unit is in the first state and the second processing unit is in the third state, the first processing unit must change to the second state. If the first processing unit is in the second state and the second processing unit is in the first state, the second processing unit can change to the second state or the first processing unit must return to the first state. The respective actual states remain the same in all other cases.

In another advantageous refinement, as soon as the successful storage of the first program part and of the second program part is identified, the first processing unit first of all returns to the second state insofar as it is not already in the state, and the second processing unit then changes to the first state.

In another advantageous refinement, two binary flags are respectively used to characterize the actual state of the first processing unit and the actual state of the second processing unit, a respective first binary flag representing an inactive or active installation routine of the first processing unit or of the second processing unit depending on its binary state, and a respective second binary flag representing a valid or invalid first program part or second program part depending on its binary state. This makes it possible to characterize the actual states of the first and second processing units in a very simple and therefore cost-effective manner.

In another advantageous refinement, after the system has been restarted, or as soon as the successful storage of the first program part and of the second program part is identified, or as soon as an error is identified when storing the first program part and/or the second program part, the predefined processing steps are carried out in the predefined order by the first processing unit and by the second processing unit on the basis of the binary states of the respective first binary flags and second binary flags. It is advantageously possible to evaluate the binary states in a very simple manner and with technically little effort.

In another advantageous refinement, as soon as the successful storage of the first program part and of the second program part is identified, the binary states of the respective first binary flags and second binary flags are reset to the binary state representing a valid program part or an inactive installation routine in a predefined order on the basis of the binary states of the respective first binary flags and second binary flags. The practice of resetting the first and second binary flags in the predefined order makes it possible to ensure the operation of the IT system at all times for a multiplicity of state combinations which the first and second processing units may have, and makes if possible for the IT system to be executable, that is to say the first and second program parts are valid and can therefore each be executed or the respective installation routine is active or the respective installation routine can at least be restarted.

In another advantageous refinement, the first processing unit is configured to initiate a start of the updating of the application program and/or to initiate an end of the updating of the application program. Only the first processing unit is preferably configured to initiate a start of the updating of the application program and/or to initiate an and of the updating of the application program. This may advantageously contribute to making it possible to better protect the IT system from tampering, for example software tampering.

In another advantageous refinement, the second processing unit is configured to decide whether the updating of the application program is started and/or ended. Only the second processing unit is preferably configured to decide whether or not updating of the application program can be started and/or ended. This may advantageously contribute to mating it possible to better protect the IT system from tampering, for example software tampering.

In another advantageous refinement, the second processing unit is configured to verify integrity of the first, program part and/or of the second program part. This makes it possible co check, for example, integrity and/or unchanged state of the first program part and/or of the second program part.

According to a second aspect, the invention is distinguished by an IT system comprising at least one first processing unit and one second processing unit. The first and second processing units are connected to one another and are configured to jointly execute an application program. The first processing unit is assigned a first memory which stores a first program part of the application program which can be executed by the first processing unit.

The second processing unit is assigned a second memory which stores a second program part of the application program which can fee executed by the second processing unit. Furthermore, the first processing unit and the second processing unit are each assigned an installation routine configured to control updating of the first program part and of the second program part. The first processing unit is configured to assign itself an actual state from a predefined set of possible states on the basis of a state of the installation routine assigned to it and on the basis of updating progress of the first program part during updating of the application program. The second processing unit is configured to assign itself an actual state from the predefined set of possible states on the basis of a state of the installation routine assigned to it and on the basis of updating progress of the second program part during updating of the application program. Furthermore, the first processing unit and the second processing unit are configured to respectively carry out predefined processing steps in a predefined order on the basis of the actual state of the first processing unit and the actual state of the second processing unit after the system has been restarted or as soon as successful storage of the first program part and of the second program part is identified or as soon as an error is identified men storing the first program part and/or the second program part.

Advantageous refinements of the first aspect also apply here to the second aspect.

In one advantageous refinement, the IT system is a digital tachograph and the first processing unit comprises an application controller and the second processing unit comprises a security controller. This advantageously makes it possible to configure the digital tachograph such that tamperproof and reliable operation of the digital tachograph is possible, both during updating of the application program and in the event of a disruption and/or interruption in the updating of the application program and in the ease of a deliberate and/or unexpected restart (also referred to as reset) of the first and/or second processing unit. A system blockade on account of an inconsistent state of the first program part and of the second program part and/or of the installation routine can be avoided.

BRIEF DESCRIPTION OF THE DRAWINGS

Exemplary embodiments of the invention, are explained below using the schematic drawings, in which.

DETAILED DESCRIPTION OF THE PRESENTLY PREFERRED EMBODIMENTS

Elements with the same construction or function are provided with the same reference symbols throughout the figures.

Figure 1:
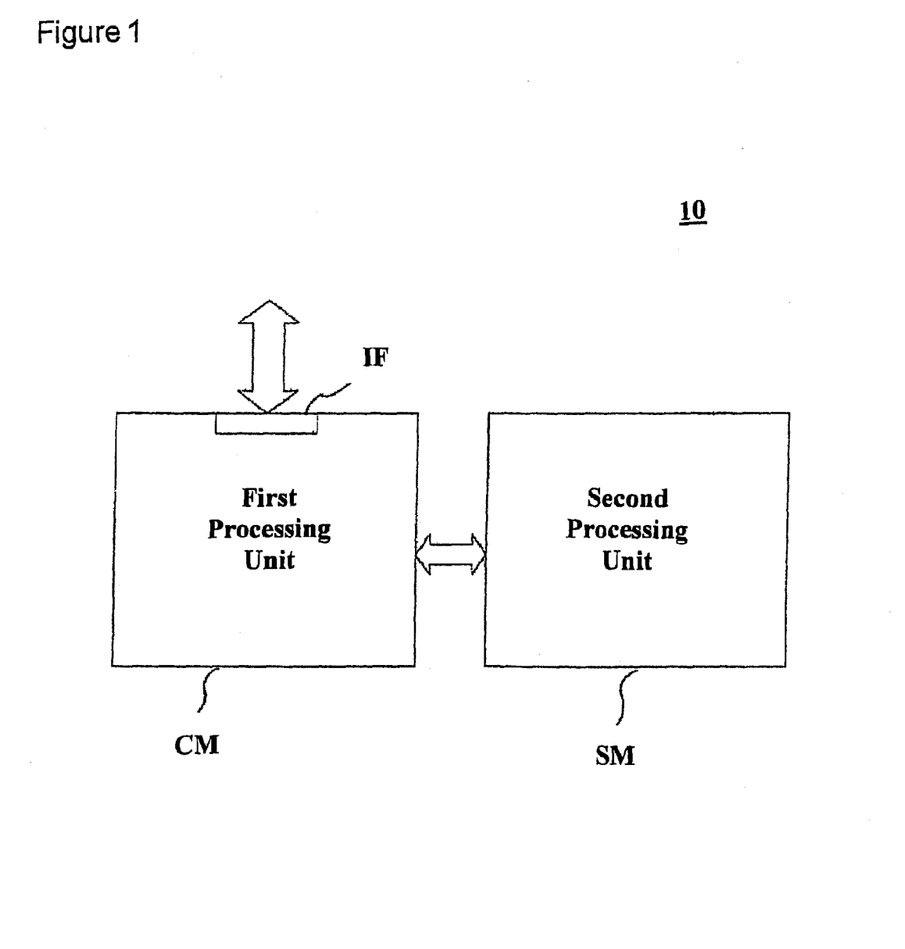
FIG. 1 shows a simplified block diagram of an IT system.

FIG. 1 shows an exemplary embodiment of an IT system 10. The IT system 10 may comprise, for example, an embedded system. For example, the IT system 10 may be included in a digital tachograph of a vehicle. The IT system 10 comprises at least one first processing unit CM and one second processing unit SM.

The first processing unit CM may comprise, for example, an application controller and the second processing unit SM may comprise, for example, a security controller.

The first processing unit CM and the second processing unit SM are connected to one another. The first processing unit CM and the second processing unit SM jointly execute an application program. For this purpose the first processing unit CM is assigned a first memory which stores a first program part of the application program which can be executed by the first processing unit CM. The second processing unit SM is assigned a second memory which stores a second program part of the application program which can be executed by the second processing unit SM. The first processing unit CM and the second processing unit SM are each assigned an installation routine SUC1, SUC2 configured to control updating of the first program part and of the second program part. The respective installation routines SUC1, SUC2 may be started from the application program, for example.

Different measures may be provided for updating the application program, which measures contribute to making it possible to ensure consistency of the application program in a simple manner and to making it possible to reliably operate the IT system 10.

For example, the second processing unit SU may be configured to verify the integrity of the first program part and/or of the second program part.

Furthermore, provision may be made for the first processing unit CM to be configured to initiate a start of the updating of the application program and/or to initiate an end of the updating of the application program. For this purpose, the first processing unit CM may have an interface IF via which the first processing unit CM can communicate with external devices. The second processing unit SM preferably does not have an external interface via which the second processing unit SM can be accessed from the outside. The first processing unit CM and the second processing unit SM may interact, for example, such that the second processing unit SM can only communicate on the basis of the first processing unit CM.

The second processing unit SM may be configured to decide whether the updating of the application program is started and/or ended. Such a decision may be dependent, for example, on successful authentication of an administrator on the second processing unit SM.

For example, prevision may be made for the application program to be characterized as invalid as soon as even only one part of the first program part and/or of the second program part is changed, and for the IT system 10 to be configured such that the application program characterized as invalid cannot fee executed.

Provision may also be made for the updating of the application program to be aborted as long as the first program part and the second program part have not yet been changed, even partially. The background for the updating not being able to be aborted after an individual change is typically the fact that the program part in the respective memory area has been overwritten and the old software is no longer stored on the respective processing unit and therefore cannot be locally restored.

Provision may also be made for the application program to be actively characterized as valid and therefore to become executable for the IT system 10 during updating of the application program following successful storage of the first and second program parts. Successful storage of the first and second program parts may also comprise. In this case, the first processing unit CM and/or the second processing unit SM, for example, having successfully verified the integrity of the first and second program parts, for example by checking an electronic signature.

The first processing unit CM is configured to assign itself an actual state from a predefined set of possible states on the basis of a stats of the installation, routine SUC1 assigned to it and on the basis of updating progress of the first program part during updating of the application program.

The second processing unit SM is configured to assign itself an actual state from the predefined set of possible states on the basis of a state of the installation routine SUC2 assigned to it and on the basis of updating progress of the second program part during updating of the application program.

The first processing unit CM and the second processing unit SM are configured to respectively carry out predefined processing steps in a predefined order on the basis of the actual state of the first processing unit CM and the actual state of the second processing unit SM after the system 10 has been restarted or as soon as successful storage of the first program part and of the second program part is identified or as soon as an error is identified when storing the first program part and/or the second program part.

The set of possible states may comprise a first state ZA representing a first valid program part or a second valid program part and a respective inactive program routine SUC1, SUC2. The set may also comprise a second state ZSUCa representing a first valid program part or a second valid program part and a respective active program routine SUC1, SUC2, and a third state ZSUCb representing a first invalid program part or a second invalid program part and a respective active program routine SUC1, SUC2.

Table 1 summarizes possible state combinations for the first processing unit CM and the second processing unit SM. Table 1 also indicates, for the respective state combinations, possible measures carried out by the first processing unit CM following a restart (also referred to as reset) in order to cancel a possible inconsistent state of the first and second program parts and of the respective installation routines SUC1, SUC2.

TABLE 1

| State of the first processing unit CM | State of the second processing unit SM | Necessary measures of the first processing unit CM on the basis of the second processing unit |
|---|---|---|
| ZA | ZA | None |
| ZA | ZSUCa | Either SM returns to the execution of the second program part or CM starts its installation routine SUC1 (CM has already obtained the authorization from SM to start its installation routine SUC1, SUC2) |
| ZA | ZSUCb | CM must start its installation routine SUC1, CM has already obtained the authorization from SM to start its installation routine SUC1 |
| ZSUCa | ZA | Either CM returns to the execution of the first program part or SM starts its installation routine SUC2 |
| ZSUCa | ZSUCa | Either CM and SM start the execution of the first and second program parts or CM and SM continue the respective installation routine SUC1, SUC2 |
| ZSUCa | ZSUCb | The first and second program parts must be updated |
| ZSUCb | ZA | This combination is unsolvable |
| ZSUCb | ZSUCa | This first and second program parts must be updated |
| ZSUCb | ZSUCb | The first and second program parts must be updated |

The state combinations shown in table 1 can be solved for the IT system 10, apart from a critical state combination in which the first processing unit CM is in the third state ZSUCb and the second processing unit SM is in the first state ZA. With the exception of when it has the critical state combination, the IT system 10 is able to respectively change the first processing unit CM and the second processing unit SM to an actual state by suitable measures, with the result that the IT system 10 is executable, that is to say the first and second program parts are valid and can therefore each be executed or the respective installation routine SUC1, SUC2 is active or the respective installation routine SUC1, SUC2 can at least be restarted.

The critical state combination may be unsellable, for instance because the first processing unit CM can no longer be started following a restart after the first program part has been partially overwritten by the updating, but the application program would be responsible for passing on the required authentication of an administrator for restarting the updating process to the second processing unit SM, but it can no longer do so in the critical state combination. The system would become unusable as a result of the resulting deadlock.

For this reason, after the system 10 has been restarted or as soon as successful storage of the first program part and of the second program part is identified or as soon as an error is identified when storing the first program part and/or the second program part, a new actual state is respectively assigned on the basis of the actual state of the first processing unit CM and the actual state of the second processing unit SM under predefined conditions according to the following rule: if the first processing unit CM is in the first state ZA and the second processing unit SM is in the second state ZSUCa, the second processing unit SM can return to the first state ZA or the first processing unit CM must change over to the second state ZSUCa. If the first processing unit CM is in the first state ZA and the second processing unit SM is in the third state ZSUCb, the first processing unit CM must change to the second state ZSUCa.

If the first processing unit CM is in the second state ZSUCa and the second processing unit SM is in the first state ZA, the second processing unit SM can change to the second, state ZSUCa or the first processing unit CM must return to the first state ZA. The respective actual states remain the same in all other cases.

Occurrence of the critical state combination is therefore avoided by the method according to the invention.

In particular, as soon as the successful storage of the first program part and of the second program part is identified, the first processing unit CM first of all returns to the second state ZSUCa insofar as it is not already in that state, and the second processing unit SM then changes to the first state ZA.

This ensures that the second processing unit SM does not immediately change from the second state ZSUCa or the third, state ZSUCb to the first state ZA after the first program part and the second program part have been stored. Instead, the first processing unit CM is in the second state ZSUCa or returns to the latter. The second processing unit SM then changes to the first state ZA.

Two binary flags CMU, CMI, SMU, SMI can be respectively used, for example, to characterize the respective actual state of the first processing unit CM and of the second processing unit SM. A respective first binary flag CMU, SMU can represent an inactive or active installation routine SUC1, SUC2 of the first processing unit CM or of the second processing unit SM depending on its binary state _erased, _set.

A respective second binary flag CMI, SMI can represent a valid or invalid first program part or second program part depending on its binary state _erased, _set.

For this purpose, the installation routine SUC1 of the first processing unit CM may be configured, for example, to allocate the respective binary state _erased, _set to the first binary flag CMU and to the second binary flag CMI of the first processing unit CM. The installation routine SUC2 of the second processing unit SM is configured, for example, to allocate the respective binary state _erased, _set to the first binary flag SMU and to the second binary flag SMI of the second processing unit CM.

The respective installation routine SUC1, SUC2 assigns a second binary state _set to the respective first binary flag CMU, SMU as soon as the installation routine SUC1 of the first processing unit CM or the installation routine SUC2 of the second processing unit SM is active. As long as the first binary flag CMU of the first processing unit CM has the second binary state _set, the installation routine SUC1 of the first processing unit CM is started when restarting the first processing unit CM, and as long as the first binary flag SMU of the second processing unit SM has the second binary state _set; the installation routine SUC2 of the second processing unit SM is started when restarting the second processing unit SM.

The respective installation routine SUC1, SUC2 assigns the second binary state _set to the respective second binary flag CMI, SMI as soon as the first program part or the second program part becomes invalid on account of a change in the first program part or the second program part.

Figure 2A:
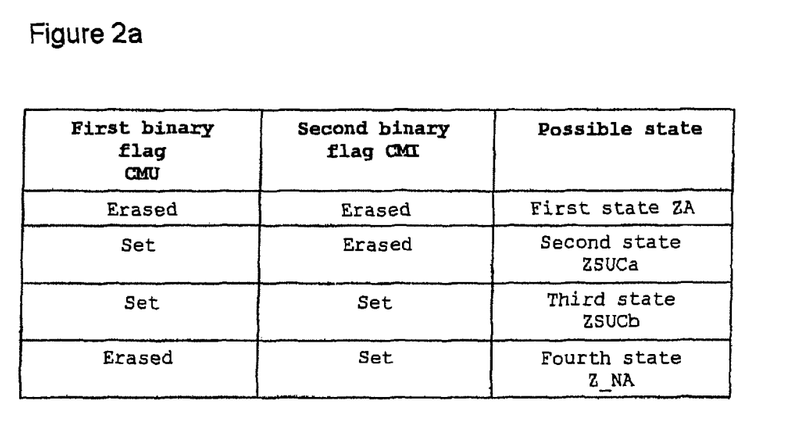
FIGS. 2A and 2B each show possible combinations of respective binary flags.
Figure 2B:
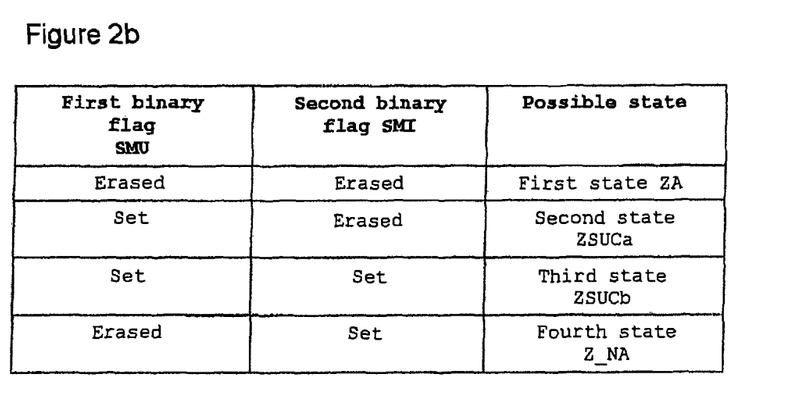

FIGS. 2A and 2B each show possible combinations of the respective binary flags CMU, CMI, SMU, SMI and the respective possible state of the first processing unit CM and of the second processing unit SM in tabular form.

The fourth, state Z_NA occurs only artificially here as a result of the use of two respective binary flags CMU, CMI, SMU, SMI for the first processing unit CM and the second processing unit SM and is not considered any further below. The first processing unit CM or the second processing unit SM could be in the fourth state Z_NA only if the respective installation routines SUC1, SUC2 and/or reset logic is/are actively and directly tampered with. In this case, the IT system 10 would be in a system blockade, tor example if a restart (also referred to as reset) is carried out at this time.

For example, after the system 10 has been restarted or as soon as the successful storage of the first program part and of the second program part is identified or as soon as an error is identified when storing the first program part and/or the second program part, the predefined processing steps can be carried out in the predefined order by the first processing unit CM and by the second processing unit on the basis of the binary states of the respective first binary flags CMU, SMU and second binary flags CMI, SMI.

In particular, as soon as the successful storage of the first program part and of the second program part is identified, the binary states _erased, _set of the respective first binary flags CMU, SMU and second binary flags CMI, SMI can be reset to the first binary state representing a valid program part or an inactive installation routine SUC1, SUC2 in a predefined order on the basis of the binary states _erased, _set of the respective first binary flags CMU, SMU and second binary flags CMI, SMI.

This avoids the second processing unit SM assigning itself the first state ZA starting from the third state ZSUCb, for example after successful storage of the first program part and of the second program part. The change of the second processing unit SM from the third state ZSUCb to the first state ZA is triggered and therefore at least partially controlled, for example, by the first processing unit CM.

Figure 3A:
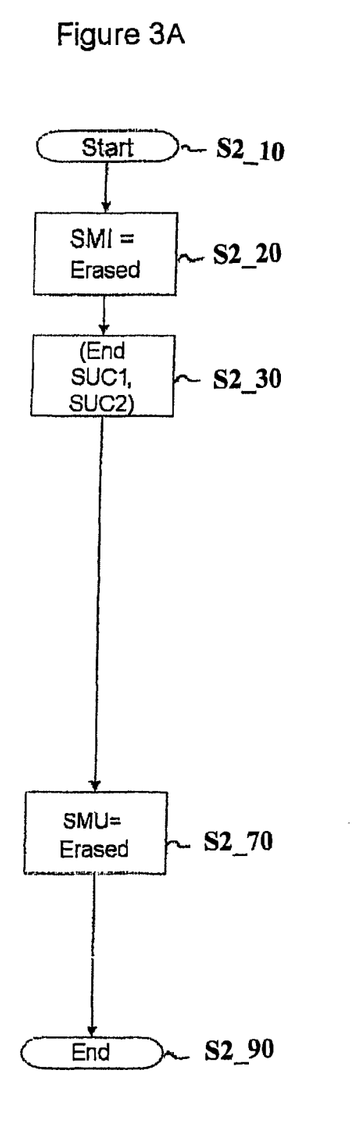
FIGS. 3A and 3B show a flowchart of a program and of a further program for operating the IT system.
Figure 3B:
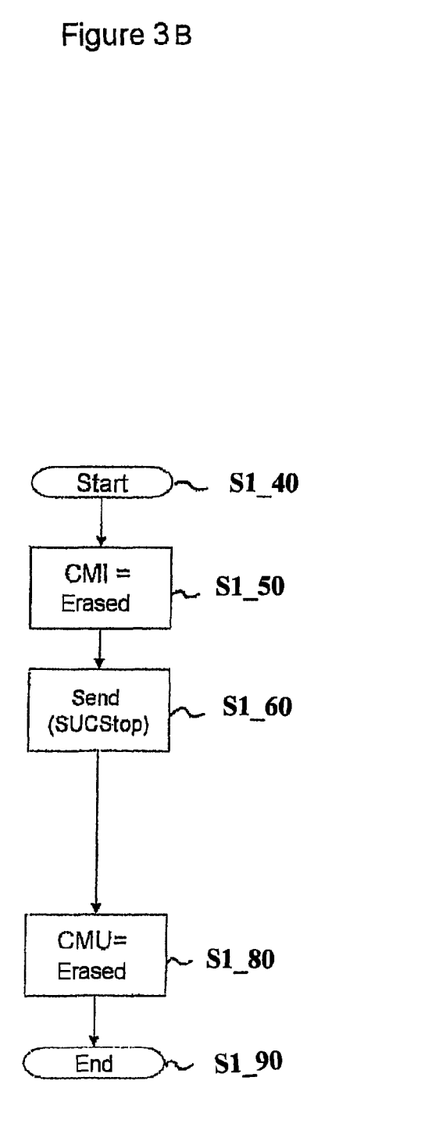

FIG. 3A shows a flowchart of a program executed, for example, by the second processing unit SM. FIG. 3B shows a flowchart of a further program executed, for example, by the first processing unit CM. The two programs are used to reset the binary flags CMU, CMI, SMU, SMI in the predefined order after successful storage of the first and second program parts, with the result that it is ensured that the IT system 10 nevertheless has art executable operating state, for example after a restart (also referred to as reset), which can also take place in an arbitrary manner during program updating.

For this purpose, the first processing unit CM is configured, for example, to send a plurality of requests to the second processing unit SM. The second processing unit SM is configured, for example, to send responses to the requests from the first processing unit CM to the first processing unit CM.

For example, the first processing unit CM may be configured to send the following requests to the second processing unit SM.

SUCStart: This request is used to cause the installation routine SUC2 to be started on the second processing unit SM insofar as the second processing unit SM allows the installation routine SUC2 to be started.

SUCStop: This request is used to cause the installation routine SUC2 to be ended on the second processing unit SM insofar as the second processing unit SM allows the installation routine SUC2 to be ended and the second program part has been successfully stored.

SUCActive: This request can be used by the first processing unit CM to check whether the installation routine SUC2 of the second processing unit SM is active.

SUCValid: This request can be used by the first processing unit CM to check whether the second program part of the second processing unit SM has been successfully stored.

The program (FIG. 3A) is started, for example, in a step S2_10. The program is started, for example, after the second processing unit SM has identified successful storage of the first and second program parts. For example, the program installation routine SUC2 of the second processing unit SM may be designed to identify that the first program part and the second program part have been successfully stored. For example, the first program installation routine SUC1 and/or the second program installation routine SUC2 may be designed to signal an error message if an error occurs when storing the first program pare or the second program part. In addition, the program installation routine SUC2 of the second processing unit SM may be designed, for example, to determine integrity of the entire first program part and second program part at the end of storage of the first and second program parts. For example, the program can be started after the integrity of the entire first program part and second program part has been determined.

In a step S2_20, the second binary flag SMI is changed to the first binary state _erased.

In a step S2_30, a signal is sent from the second processing unit SM to the first processing unit CM, for example, in order to signal that the respective program installation routines SUC1, SUC2 can be ended.

In a step S2_70, the first binary flag SMU is changed over from the second binary state _set to the first binary state _erased after the second processing unit SM has received the second command SUCStop sent by the first processing unit CM.

The program is ended in a step S2_90.

The further program (FIG. 3B), which is executed by the first processing unit CM, is started, for example, in a step S1_40. The further program is preferably started after the signal for signaling that the respective program installation routines SUC2, SUC1 can be ended has been identified, which signal has been sent from the second processing unit SM to the first processing unit CM.

In a step S1_50, the binary state of the second binary flag CMI of the first processing unit CM is changed over, with the result that it has the first binary state _erased.

In a step S1_60, the first processing unit CM sends the second command SUCStop to the second processing unit SM.

In a step S1_80, the binary state of the first binary flag CMU of the first processing unit CM is changed over, with the result that it has the first binary state _erased.

The further program is ended in a step S1_90.

In the event of an error during updating of the application program, for example after communication disruptions or in the event of an unsuccessful final test, the following measures are taken, for example, so that the critical state combination cannot occur;

If the error occurs in the second processing unit SM, the latter reports an error to the first processing unit CM. The first processing unit CM is therefore also aware in this case that an error has occurred.

In a first step, the first processing unit CM sends the request SUCValid to the second processing unit SM and thus receives, together with its own second binary flag CMI, the information regarding whether or not a return to the execution of the first and second program parts, that is to say the execution of the application program, is allowed. If such a return is not allowed, the respective installation routines SUC1, SUC2 are restarted in a second step. In this case, the fourth step is carried out as the next step. If the return is allowed, a user can decide, for example, in the second step whether the application program or the respective installation routines SUC1, SUC2 is/are intended to be restarted. If the application program is intended to be restarted, the first processing unit CM sends the request SUCStop to the second processing unit SM in a third step and erases its own first binary flag CMU after a positive response. In a fourth step, a restart (also referred to as reset) is respectively carried out on the first processing unit CM and on the second processing unit SM and the application program is started or the respective installation routines SUC1, SUC2 are restarted.

It is thus advantageously ensured that the IT system 10 does not have the critical state combination following successful storage of the first program part and of the second program part or in the event of an error or in the event of an unexpected restart (also referred to as reset). In the event of an unexpected restart, the respective first binary flag CMU, SMU decides whether the respective program part or the respective installation routine SUC1, SUC2 is started.

In another exemplary embodiment variant of the IT system 10, it is possible to dispense with an explicit request SUCValid for querying the actual state of the second processing unit SM if the request SUCStop reports an error value if the first binary flag SMU of the second processing unit SM cannot be erased because the first binary flag SMI of the second processing unit SM still has the second binary state _set. The behavior of this implementation differs slightly from the embodiment Variant described above in the event of an error because the first processing unit CM does not yet have any information relating to the validity of the second program part and cannot offer a user, for example, the choice of either changing back to execution of the first and second program parts or continuing the updating. This means that it is no longer possible to distinguish between the second state ZSUCa and the third state ZSUCb in the event of an error.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating an IT system having at least one first processing unit and one second processing unit connected to one another and configured to jointly execute an application program, the first processing unit being assigned a first memory that stores a first program part of the application program, which can be executed by the first processing unit, and the second processing unit being assigned a second memory that stores a second program part of the application program, which can be executed by the second processing unit, the first processing unit and the second processing unit each being assigned an installation routine configured to control updating of the first program part and the second program part, the method comprising:

assigning an actual state from a predefined set of possible states to the first processing unit and assigning a second actual state from the predefined set of possible states to the second processing unit on the basis of a state of the respective installation routine and on the basis of respective updating progress of the first program part and of the second program part during updating of the application program; and after the system has been restarted or when successful storage of the first program part and of the second program part is identified or when an error is identified when storing the first program part and/or the second program part, carrying out predefined processing steps respectively in a predefined order by the first processing unit and by the second processing unit on the basis of the assigned actual state of the first processing unit and the assigned second actual state of the second processing unit, wherein the set of possible states comprises a first state representing a first valid program part or a second valid program part and a respective inactive installation routine, a second state representing a first valid program part or a second valid program part and a respective active installation routine, and a third state representing a first invalid program part or a second invalid program part and an active installation routine of the first processing unit or of the second processing unit.

2. The method as claimed in claim 1, further comprising, after the system has been restarted or when the successful storage of the first program part and of the second program part is identified or when the error is identified when storing the first program part and/or the second program part, respectively assigning a new actual state on the basis of the assigned actual state of the first processing unit and the assigned actual second state of the second processing unit trader predefined conditions according to the following rule:

if the first processing unit is in the first state and the second processing unit is in the second state, the second processing unit can return to the first state or the first processing unit must change over to the second state, if the first processing unit is in the first state and the second processing unit is in the third state, the first processing unit must change to the second state, if the first processing unit is in the second state and the second processing unit is in the first state, the second processing unit can change to the second state or the first processing unit must return to the first state, and the respective actual states remain the same in all other cases.

3. The method as claimed in claim 2, further comprising, when the successful storage of the first program part and of the second program part is identified, first returning the first processing unit to the second state insofar as it is not already in said state, and then changing the second processing unit to the first state.

4. The method as claimed in claim 1, wherein two binary flags are respectively used to characterize the actual state of the first processing unit and the actual state of the second processing unit, a respective first binary flag represents an inactive or active installation routine of the first processing unit or of the second processing unit depending on its binary state, and a respective second binary flag represents a valid or invalid first program part or second program part depending on its binary state.

5. The method as claimed in claim 4, further comprising, after the system has been restarted or when the successful storage of the first program part and of the second program part is identified or when the error is identified when storing the first program part and/or the second program part, carrying out the predefined processing steps in a predefined order by the first processing unit and by the second processing Unit on the basis of the binary states of the respective first binary flags and second binary flags.

6. The method as claimed in claim 5, further comprising, when the successful storage of the first program part and of the second program part is identified, resetting the binary states of the respective first binary flags and second binary flags to the binary state representing a valid program part or an inactive installation routine in a predefined order on the basis of the binary states of the respective first binary flags and second binary flags.

7. The method as claimed in claim 1, in which the first processing unit is configured to initiate a start of the updating of the application program and/or to initiate an end of the updating of the application program.

8. The method as claimed in claim 1, in which the second processing unit is configured to decide whether the updating of the application program is started and/or ended.

9. The method as claimed in claim 1, in which the second processing unit is configured to verify integrity of the first program part and/or of the second program part.

10. An IT system comprising:
   at least one first processing unit and one second processing unit connected to one another and configured to jointly execute an application program, the first processing unit being assigned a first memory that stores a first program part of the application program, which can be executed by the first processing unit, and the second processing unit being assigned a second memory that stores a second program part of the application program, which can be executed by the second processing unit, the first processing unit and the second processing unit each being assigned an installation routine configured to control updating of the first program part and of the second program part, wherein:
   the first processing unit is configured to assign itself an actual state from a predefined set of possible states on the basis of a state of the installation routine assigned to it and on the basis of updating progress of the first program part during updating of the application program,
   the second processing unit is configured to assign itself a second actual state from the predefined set of possible states on the basis of a state of the installation routine assigned to it and on the basis of updating progress of the second program part during updating of the application program, and
   the first processing unit and the second processing unit are configured to respectively carry out predefined processing steps in a predefined order on the basis of the assigned actual state of the first processing unit and the assigned second actual state of the second processing unit after the system has been restarted or when successful storage of the first program part and of the second program part is identified or when an error is identified when storing the first program part and/or the second program part,
   wherein the set of possible states comprises a first state representing a first valid program part or a second valid program part and a respective inactive installation routine, a second state representing a first valid program part or a second valid program part and a respective active installation routine, and a third state representing a first invalid program part or a second invalid program part and an active installation routine of the first processing unit or of the second processing unit.

11. The IT system as claimed in claim 10, wherein the IT system is a digital tachograph, the first processing unit comprises an application controller, and the second processing unit comprises a security controller.

* * * * *